US008873403B2

(12) United States Patent
Meloche (10) Patent No.: US 8,873,403 B2
(45) Date of Patent: Oct. 28, 2014

(54) SYSTEM AND METHOD FOR AUTOMATIC DSCP TRACING FOR XOIP ELEMENTS

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 255 days.

(21) Appl. No.: 13/401,060

(22) Filed: Feb. 21, 2012

(65) Prior Publication Data

US 2013/0215768 A1 Aug. 22, 2013

(51) Int. Cl.
*H04L 1/00* (2006.01)
*H04L 12/26* (2006.01)
*H04J 1/16* (2006.01)
*H04J 3/14* (2006.01)
*H04L 12/24* (2006.01)

(52) U.S. Cl.
CPC ............ *H04L 12/2469* (2013.01); *H04L 12/24* (2013.01); *H04L 12/2464* (2013.01)
USPC ........... 370/242; 370/241; 370/245; 370/248; 370/252

(58) Field of Classification Search
CPC ............ H04L 12/2469; H04L 12/2464; H04L 12/2404; H04L 12/24; H04L 12/2408; H04L 12/2401; H04L 12/2402; H04L 12/2403; H04L 12/2405; H04L 12/2406; H04L 12/2407
USPC .......... 370/229, 230, 231, 235, 351, 389, 390
See application file for complete search history.

(56) References Cited

U.S. PATENT DOCUMENTS

| | | | |
|---|---|---|---|
| 6,826,150 B1 | 11/2004 | Bhattacharya et al. | |
| 6,944,169 B1* | 9/2005 | Yoshizawa et al. | 370/410 |
| 8,509,072 B2 | 8/2013 | Lee et al. | |
| 2002/0031091 A1 | 3/2002 | Van Everdingen | |
| 2002/0097677 A1 | 7/2002 | Hoar et al. | |
| 2003/0204619 A1 | 10/2003 | Bays | |
| 2005/0053009 A1* | 3/2005 | Denby et al. | 370/250 |
| 2005/0276219 A1 | 12/2005 | Wang et al. | |
| 2007/0076605 A1* | 4/2007 | Cidon et al. | 370/230 |
| 2009/0067332 A1 | 3/2009 | Iwakiri et al. | |
| 2009/0268622 A1* | 10/2009 | Blum et al. | 370/252 |
| 2011/0075560 A1 | 3/2011 | Delregno et al. | |
| 2011/0103377 A1 | 5/2011 | Hua et al. | |
| 2011/0211449 A1 | 9/2011 | Attar et al. | |
| 2011/0261696 A1 | 10/2011 | Crisan et al. | |
| 2012/0250505 A1 | 10/2012 | Brolin | |
| 2013/0100810 A1 | 4/2013 | Slothouber | |
| 2013/0107703 A1 | 5/2013 | Cherian et al. | |
| 2013/0163594 A1 | 6/2013 | Sharma et al. | |

* cited by examiner

*Primary Examiner* — Kwang B Yao
*Assistant Examiner* — Adam Duda (57) ABSTRACT

Systems, methods, and non-transitory computer-readable storage media for performing automatic Differentiated Services Code Point tracing for XoIP elements. A system configured as an agent maintains a cache of destination network addresses based on prior network communications. Then, the system identifies a destination network address to test. The system can identify the destination network address to test based on the cache of destination network addresses. The cache can include additional information, such as network test results, traffic information, port numbers, DSCP trace value, measurements of traffic protection, service provider information, etc. Next, the system automatically sends to the destination network address a network test configured to determine a Differentiated Services Code Point trace. The system can perform the network test for any type of network traffic and port.

20 Claims, 3 Drawing Sheets

SYSTEM AND METHOD FOR AUTOMATIC DSCP TRACING FOR XOIP ELEMENTS

BACKGROUND

1. Technical Field

The present disclosure relates to Differentiated Services and more specifically to automatic DSCP tracing for XoIP.

2. Introduction

The Internet Protocol (IP) was created without the ability to add priority to packets to allow latency-intolerant packets, such as voice packets, to be transmitted first during periods of congestion. As a result, Differentiated Services, or DiffServ, was created to allow management and prioritization of network traffic on modern IP networks. With DiffServ, network hardware marks packets on the network with a Differentiated Services Code Point (DSCP) mark, and other network hardware treats packets according to a corresponding level of service associated with the marks. Differentiated Services Code Point (DSCP) is a field in an IP packet that enables different levels of service to be assigned to network traffic. In particular, DSCP adds priority and offers different services to different types of packets. Routers in a DiffServ network can then pass high-priority packets during periods of high congestion, while delaying low-priority packets. Thus, DiffServ can, for example, provide low-latency to critical network traffic, such as voice or streaming media, while providing simple best-effort delivery to non-critical traffic, such as web browsing or file transfers.

A DiffServ network often includes a Service Level Agreement (SLA) Monitor that verifies service guarantees, validates network performance, and identifies network issues. Generally, an SLA Monitor server uses registered agents to trace the DSCP marking on the paths between the registered agents. A judicious selection of agents can be made to monitor the Customer Edge-Premise Edge (CE-PE) links of the network—where a substantial fraction of problems commonly arise—since even a large enterprise network may not have more than a few hundreds of such links.

However, QoS (Quality of Service) issues can also arise from the Local Area Network (LAN), and monitoring the LAN part of the network can be an extremely burdensome task, as typical monitoring approaches are difficult to scale to large networks. Furthermore, the registered agents perform DSCP and protection tests using User Datagram Protocol (UDP) traffic to specific ports. While this may be sufficient to detect some network performance issues, it greatly limits the registered agents' ability to detect issues with other types of traffic and ports, as network infrastructures often vary their treatment of different types of packets (e.g., UDP, TCP and ICMP) sent to different ports. For example, a UDP test to port 50012 may not reveal an issue with TCP traffic to port 80. Yet testing every combination of packets and ports is unfeasible. Consequently, the registered agents are often unable to detect a substantial amount of network issues.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to perform automatic DSCP traces for any type of traffic and networking port using agents. Here, the agents can detect issues with any type of network traffic and port, as they are not limited to UDP traffic to specific ports. Moreover, unlike the server-based system that instructs agents when and where to run a test, the agents can implement automatic testing that can include a determination of a DSCP trace and a measurement of protection to any destination with which the agents communicate. Agents can identify, receive, and store necessary information upon which to independently determine whether to run network tests when appropriate, thus avoiding redundant and unnecessary tests. The agents can rely on detection algorithms and thresholds in order to determine when to run these tests. Further, agents can coordinate with each other to share obtained information, to avoid running duplicate tests, and to coordinate tests to identify and pinpoint problems in fewer steps. Further, the agents can filter test results for output to a human or other entity in charge of resolving network problems. In limited instances, the agents have authority, permissions, and capability to perform certain remedial measures to resolve certain network issues raised by the tests. The agents can thus target specific devices to test as needed. This can eliminate the need to perform the extremely burdensome task of monitoring every device on the network.

Disclosed are systems, methods, and non-transitory computer-readable storage media for performing automatic DSCP tracing for XoIP elements. The method is discussed in terms of a system implementing the method, such as a network router, a network switch, other network infrastructure device, or network monitoring device. In one implementation, the system is a device which is integrated as part of network infrastructure, and can activate automatic DSCP tracing on an as-needed basis, but the system can alternately be a device which is attached to the network and can interact with network elements for the purposes of automatic DSCP tracing, but does not otherwise provide a network service or support other network devices. The system can be an agent configured to perform automatic DSCP tracing for XoIP elements. The system maintains a cache of destination network addresses based on prior network communications. For example, when the system communicates with a device, the system can store that device's network address in the cache. The system can also store in the cache the network address of any device that has successfully communicated with the system and/or another agent. Moreover, the system can store in the cache any network address that has previously been tested. The cache can include IP addresses, MAC addresses, port numbers, IP precedence values, DSCP values, class of service values, protocol information, measurements of protection, DSCP traces, traffic information, network test results, service provider information, routing information, domain names, communications history, marking templates, and so forth.

The system then identifies a destination network address to test. In one embodiment, the system identifies the destination network address to test by determining whether the destination network address is in the cache of destination network addresses. Here, the cache includes previously tested IP addresses—tested by the system and/or another device. By only testing addresses that are not in the cache, the system can avoid performing redundant and/or unnecessary tests. For example, before the system communicates with another device, the system can check if the IP address of the other device is in the cache. If the system determines that the IP address of the other device is not in the cache, the system can identify that IP address as the destination network address to test. As a result, the system performs network tests as necessary, when it needs to communicate with a device that has not been previously tested by the system and/or another device. This eliminates the burdensome task of monitoring every device in the network, as opposed to monitoring targeted devices on an as-needed basis.

When the system adds a network address to the cache, it can also identify such network address as the destination network address to test. Thus, the system tests an address as it adds it to the cache. For example, when an address is added to the cache, the system can identify the address as a destination network address to test. The system can then test the destination network address, and add the network test results to the cache.

After identifying the destination network address to test, the system can automatically send, to the destination network address, a network test configured to determine a Differentiated Services Code Point trace. The system can perform the network test for any type of traffic, networking port, and destination with which it communicates. As a result, the system can detect issues with any type of network traffic and port. For example, for any destination network address that the system identifies, the system can automatically perform a test to determine how DSCP markings would evolve as they traverse the network towards the destination. The system can also classify the traffic (e.g., video, audio, image, text) and send a network test to the destination network address to determine if the network handles the DSCP correctly.

In one embodiment, the system automatically sends to the destination network address a network test configured to determine a Differentiated Services Code Point trace and a measurement of protection. In another embodiment, the system is configured to automatically determine whether a DSCP trace is adequate. The system can incorporate marking templates for analyzing traffic as it moves from one network segment to another segment. Templates for adequate markings can indicate, for example, whether markings are expected to change along the path, and what additional requirements may be prompted by a change.

The system can also be configured to periodically test the network for the IP addresses in the cache and report test results to a server. In one embodiment, the system uses SNMP traps sent to an SNMP monitoring server to automatically report issues with DSCP traces and/or lack of protection. As an entry for the network entity in the cache ages, the system can clear the entry from the cache if no recent activity has been recorded in connection with that entity.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for automatic DSCP testing for all traffic, media, and signaling. A system, method and non-transitory computer-readable media are disclosed which identify a destination network address to test, and automatically send, via an agent device, a network test configured to determine a Differentiated Services Code Point trace to the destination network address. A brief introductory description of a basic general purpose system or computing device in FIG. 1, which can be employed to practice the concepts, is disclosed herein. A discussion of the Differentiated Services networking architecture and a detailed description of automatic DSCP tracing will then follow, accompanied by variations and examples. These variations shall be discussed herein as the various embodiments are set forth. The disclosure now turns to FIG. 1.

Figure 1:
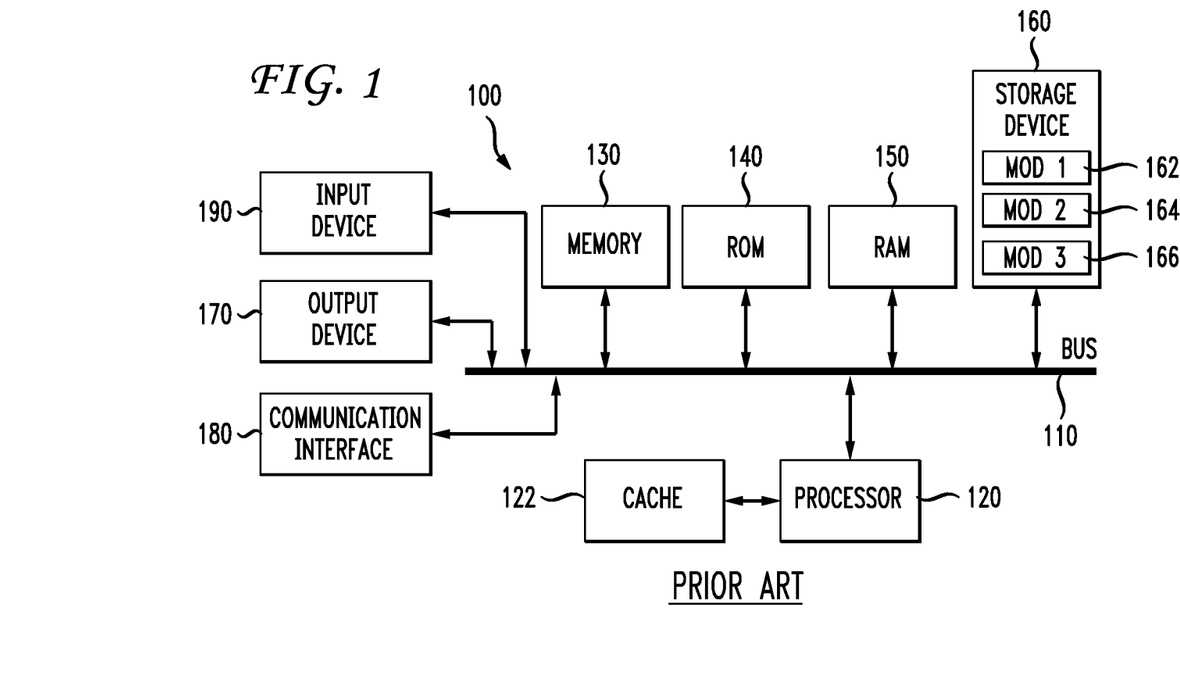
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120.

Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of the Differentiated Services networking architecture. Differentiated Services (DiffServ) is a network architecture that provides a model for managing and classifying network traffic and providing Quality of Service (QoS) on IP networks. With DiffServ, packets on the network are marked with a Differentiated Services Code Point (DSCP), and a corresponding level of service is then appropriated for the packets. DSCP is a field in an IP packet that enables different levels of service to be assigned to network traffic. Specifically, DSCP identifies a particular per-hop behavior (PHB) to be applied to a marked packet. The marked packet is then forwarded according to the PHB associated with the DSCP. Typically, the levels of service are defined by a Service Level Agreement (SLA), which specifies the forwarding service that a customer will receive.

DiffServ can include one or more Differentiated Services domains. A Differentiated Services domain, or DiffServ domain, refers to a contiguous portion of a network that implements a common set of DiffServ policies, which are administered in a coordinated fashion. The coordinated administration ensures that adequate resources are provisioned to support the differentiated services ordered by the DiffServ domain. Nodes within the DiffServ domain select a forwarding treatment for packets based on the packet's DSCP. More specifically, the nodes within the DiffServ domain map the DSCP to a particular forwarding treatment, or per-hop behavior, at each network node along its path.

A DiffServ domain can include one or more networks having consistent DiffServ policies. Moreover, a DiffServ domain can include different administrative domains or autonomous systems, different trust regions, different network technologies (e.g., Ethernet, frame relay, cellular), hosts and routers, etc. One example of two different administrative domains interacting is an internal college campus network that interfaces with a network of a regional Internet service provider. A DiffServ domain additionally includes a DiffServ boundary, which refers to the edge of a DiffServ domain, where classifiers and traffic conditioners are typically deployed. In some cases, a DiffServ domain is further divided into ingress and egress nodes, which represent the downstream/upstream nodes of a boundary link in a given traffic direction. The DiffServ boundary is generally located at the ingress to the first-hop DiffServ-compliant router or node traversed by a host's traffic, or at the egress of the last-hop DiffServ-compliant router or node traversed by a host's traffic.

Figure 2:
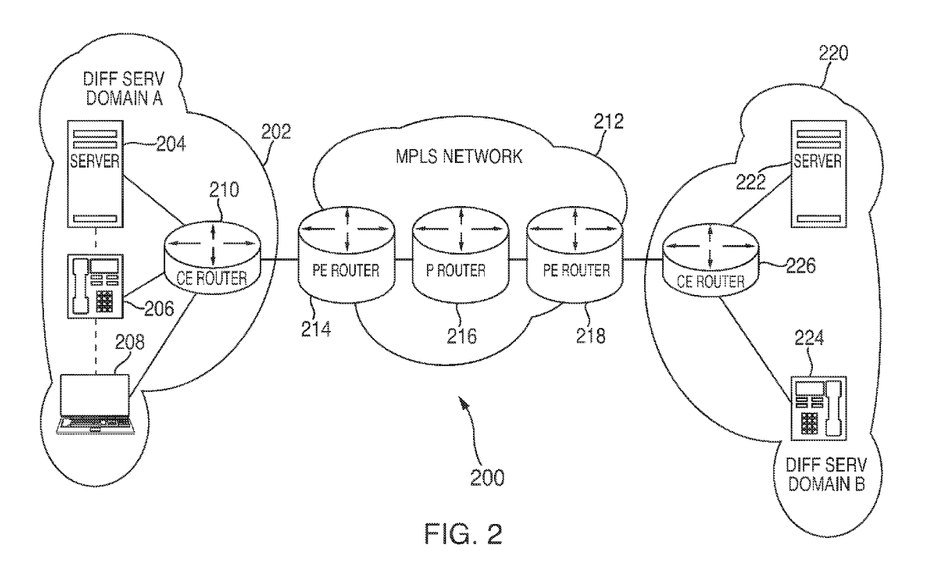
FIG. 2 illustrates an exemplary network architecture supporting automatic Differentiated Services Code Point tracing for XoIP Elements.

Having disclosed some components of a Differentiated Services networking architecture, the disclosure now turns to FIG. 2, which illustrates an exemplary network architecture 200 supporting automatic DSCP tracing for XoIP Elements. The principles set forth herein can be applied to local area networks, wide area networks, virtual private networks, intranets, home networks, corporate networks, and virtually any other form of network.

In this example, the network architecture 200 includes three Differentiated Services domains: DiffServ Domain A 202, MPLS Network 212, and DiffServ Domain B 220. Each can include one or more networks that implement common DiffServ policies, as well as different administrative domains or autonomous systems, different trust regions, different network technologies (e.g., Ethernet, frame relay, cellular), hosts and routers, etc.

DiffServ Domain A 202 includes a server 204, registered agents 206 and 208, and a customer edge router 210. The server 204 and registered agents 206, 208 can connect to the customer edge router 210, and can also be configured to connect to each other. Similarly, DiffServ Domain B 220 includes a server 222, a registered agent 224, and a customer edge router 226. The server 222 and registered agent 224 can connect to the customer edge router 226, and can also be configured to connect to each other. In FIG. 2, the registered agents 206 and 224 are phones configured to use Voice-Over-IP (VOIP), and the registered agent 208 is a computer. Other exemplary devices which could be configured as registered agents are tablet computers, conferencing systems, network media players, televisions with networking capabilities, video game consoles, mobile phones, vehicles equipped with mobile network access, and so forth. Each device can include capabilities for sending, receiving, storing, and/or producing media communications, such as audio, video, text, image, etc.

The MPLS Network 212 is a DiffServ Domain that includes an Internet Service Provider (ISP) network configured to use Multiprotocol Label Switching (MPLS). The MPLS Network 212 has two provider edge routers 214, 218, and a provider router 216 that links to the provider edge routers 214, 218. The provider edge routers 214, 218 link the MPLS Network 212 to DiffServ Domain A 202 and DiffServ Domain B 220 via customer edge routers 210 and 226, respectively. The provider router 216 can be a Label Switch Router (LSR) that functions as a transit router of the core network.

The customer edge routers 210, 226 can be any routers used to link DiffServ Domain A 202 and DiffServ Domain B 220 to the MPLS Network 212 via provider edge routers 214 and 218, respectively. The servers 204, 222 can include any device with networking capabilities. Moreover, the servers 204, 22 can include a network utility, such as an SLA monitor, that verifies service guarantees, validates network performance, and/or identifies network issues. Similarly, the registered agents 206, 208, 224 can include software for performing automatic network tests. For example, the registered agents 206, 208, 224 can incorporate marking templates for analyzing traffic as it moves from one network segment to another segment. Moreover, the registered agents 206, 208, 224 can be configured to use Simple Network Management Protocol (SNMP) traps sent to an SNMP monitoring system, such as servers 204 and 222, to automatically report issues with DSCP traces or lack of protection. In one embodiment, the registered agents 206, 208, 224 are configured to report inability to trace the DSCP, incorrect DSCP marking traces, out-of-contract packets in excess of a threshold, and protection measures below a configured threshold.

Further, the registered agents 206, 208, 224 can be configured to store and detect network information, such as routing information. The registered agents 206, 208, 224 can also be configured to detect communications sent and/or received by the registered agents 206, 208, 224, and store communications information, such as IP addresses, MAC addresses, traffic descriptions, protocol information, port numbers, and so forth. In one embodiment, the registered agents 206, 208, 224 are configured to store data in a circular buffer where fixed IP addresses are stored permanently and media IP addresses are recycled or dropped out of the list after a period of time. In another embodiment, the registered agents 206, 208, 224 store IP addresses in a list and periodically test the network for the IP addresses in the list. The registered agents 206, 208, 224 can be configured to store test results and/or report test results to a central server, such as servers 204 and 222. The registered agents 206, 208, 224 can also be configured to remove stored test results and start over. For example, the registered agents 206, 208, 224 can be configured to remove cached test results and start over after a period of time.

The registered agents 206, 208, 224 can also be configured to automatically determine whether a DSCP trace is adequate. To automatically determine whether a DSCP trace is adequate, one or more of the registered agents 206, 208, 224 can identify a service provider based on a template of correct DSCP traces for each possible service provider provisioned to each respective registered agent 206, 208, 224. The registered agents 206, 208, 224 can then determine if the DSCP trace is adequate based on the template of correct DSCP traces for the identified service provider. To identify the service provider, the registered agents 206, 208, 224 can include a list of network subnet addresses that are associated with each service provider. For example, the registered agents 206, 208, 224 can include a list with the network subnet address of MPLS Network 212. Alternatively, the registered agents 206, 208, 224 can be provisioned with the IP address of the Multiprotocol Label Switching (MPLS) router which feeds the customer edge (CE) router for each site. For example, the registered agents 206 and 208 can be provisioned with the IP address of provider edge router 214, which connects to the customer edge router 210.

Templates for adequate markings can indicate whether markings are expected to change along the path, and which changes are expected. For example, an adequate DSCP trace for video packets across the MPLS Network 212 can include 36 up to the customer edge router 210, 26 or 28 from the customer edge router 210 forward, and 35 after the provider edge router 214.

Figure 3:
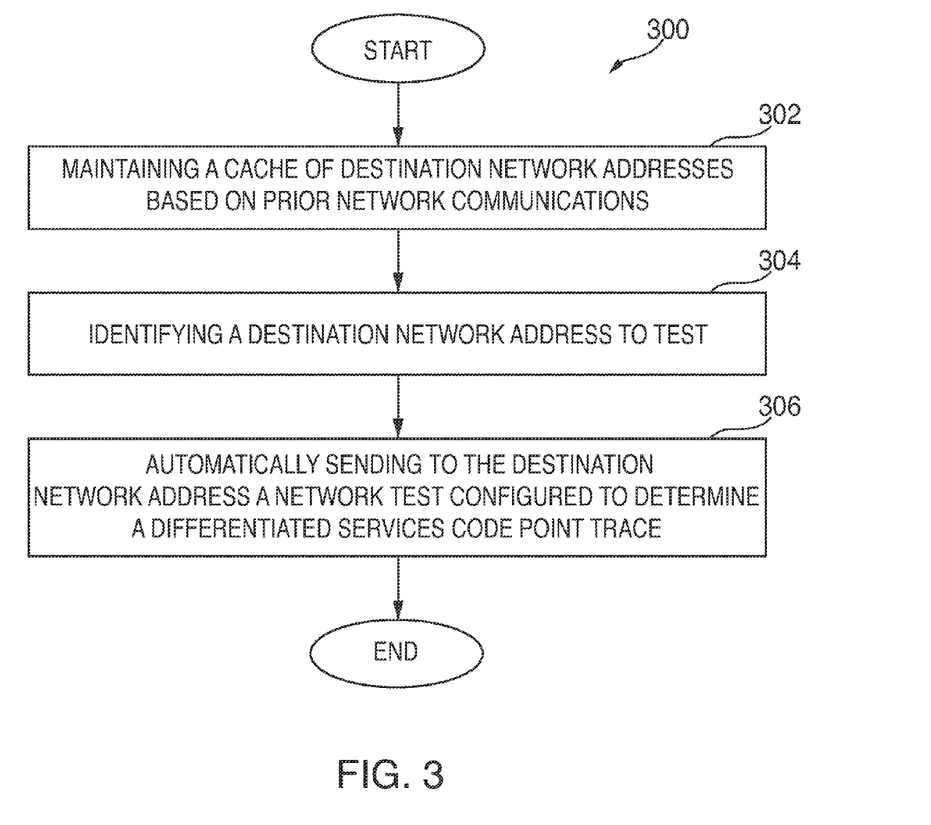
FIG. 3 illustrates an example method embodiment.

Having disclosed some basic system components and concepts, the disclosure now turns to the exemplary method embodiment shown in FIG. 3. For the sake of clarity, the method is discussed in terms of an exemplary system 100 as shown in FIG. 1 configured to practice the method as a registered agent. The steps outlined herein are exemplary and can be implemented in any combination thereof, including combinations that exclude, add, or modify certain steps.

In FIG. 3, the system 100 is a registered agent configured to perform automatic network tests. Here, the system 100, as a registered agent, can trace DSCP marking on paths between the system 100 and other registered agents, for any type of network traffic and port. A registered agent can be, for example, a phone, a computer, a conferencing system, a network media player, a smart television, a video game console, a tablet computer, a vehicle equipped with mobile network access, a streaming device, and so forth. A registered agent can include capabilities for sending, receiving, storing, and/or producing media communications, such as audio, video, text, image, etc. Moreover, a registered agent can include software and corresponding hardware for executing the software for sending and receiving network communications, detecting and analyzing network communications, classifying network traffic, performing network tests, reporting test results, identifying network providers, identifying routing information, performing DSCP tracing, measuring protections, determining adequacy of a DSCP trace, etc. All or part of this functionality can be implemented as dedicated hardware, firmware, software running on a general-purpose processor, and so forth. In addition, a registered agent can be configured to detect communications sent and/or received by the registered agent, and store communications information, such as IP addresses, MAC addresses, traffic information (e.g., traffic type), protocol information, port numbers, and so forth. A registered agent can also be configured to communicate, via a wired or wireless connection, with a server, a router, a phone, a conferencing system, an SLA Monitor system, an SNMP monitoring system, a storage system, a database system, a network device, a network resource, other agent devices, etc.

Instead of a server-based system that instructs agents which tests to run and to which destination, the agent or system can implement automatic testing that includes both the determination of a DSCP trace and a measurement of protection to any and all destinations with which it communicates. The system can be provisioned with the information necessary to determine by itself whether a DSCP trace is adequate and use SNMP traps sent to an SNMP monitoring system to report issues with DSCP traces or lack of protection automatically. Such testing can be performed for whatever type of traffic the agent happens to use in the course of its operations. The agent can avoid making redundant tests (testing for the same type of traffic to the same destination and the same port) and can age its cache of test results so that redundant tests are performed periodically. This approach extends this process to not only the destination of RTP (real-time transport protocol) traffic but to all outgoing traffic, media and signaling and to perform tests that reveal the DSCP trace and the measure of protection in the case of audio and video traffic.

The system 100 maintains a cache of destination network addresses based on prior network communications (302). For example, as the system 100 sends/receives communications to other devices, the system 100 can store the network addresses of the other devices. In addition, the system 100 can store traffic information. For example, the system 100 can store the port number, the MAC address, the IP precedence value, the DSCP value, the class of service value, the protocol type, the measurement of protection, the DSCP trace, the traffic type, etc. Further, the system 100 can store network test results associated with the network address. For example, the system 100 can store information relating to the ability or inability to trace the DSCP, incorrect DSCP marking traces, out-of-contract packets in excess of a threshold, protection measures below a configured threshold, etc. Information in the cache can be configured to age/expire after a specified amount of time. In one embodiment, the system 100 is configured to store data in a circular buffer where fixed IP addresses are stored permanently and media IP addresses are recycled or dropped out of the cache after a period of time.

Next, the system 100 identifies a destination network address to test (304). In one embodiment, the system 100 identifies the destination network address to test by determining whether the destination network address is in the cache of destination network addresses. Here, the cache includes a list of IP addresses that have been previously tested by the system 100 and/or another device. Thus, by only testing addresses that are not in the cache, the system 100 can avoid performing redundant and/or unnecessary tests. For example, before the system 100 communicates with another device, the system 100 can check if the device's IP address is in the cache and, if not, the system 100 can identify the IP address as the destination network address to test. As a result, the system 100 only performs a network test for an address as necessary, when it needs to communicate with a device that has not been previously tested by the system 100 and/or another device.

In another embodiment, when the system 100 adds a network address to the cache, it also identifies such network address as the destination network address to test. Thus, the system 100 can test an address as it adds it to the cache. For example, when an address is added to the cache, the system 100 can automatically identify the address as a destination network address to test. The system 100 can then classify the traffic (e.g., video, audio, image, text) that it intends to send to, or receive from, that address, and automatically send a network test as discussed in step 306.

Finally, the system 100 automatically sends to the destination network address a network test configured to determine a Differentiated Services Code Point trace (306). The system 100 can perform the network test for any type of traffic, networking port, and destination with which it communicates. For example, for any destination network address that the system 100 identifies, the system 100 can automatically perform a test to determine how DSCP markings would evolve as they traverse the network(s) towards the destination. The system 100 can classify the traffic (e.g., video, audio, image, data) and send a network test to the destination network address to determine if the network (or networks) handles the DSCP correctly.

In one embodiment, the system automatically sends to the destination network address a network test configured to determine a Differentiated Services Code Point trace and a measurement of protection. In another embodiment, the system 100 is configured to automatically determine whether a DSCP trace is adequate. To automatically determine whether a DSCP trace is adequate, the system 100 can be configured to identify a service provider, and provisioned with a template of correct DSCP traces for each possible service provider. The system 100 can then determine if the DSCP trace is adequate based on the template of correct DSCP traces for the identified service provider. To identify the service provider, the system 100 can include a list of network subnet addresses that are associated with each service provider. Alternatively, the system 100 can be provisioned with the IP address of the MPLS router which feeds the CE router for each site. Moreover, the system 100 can incorporate marking templates for analyzing traffic as it moves from one network segment to another segment. Templates for adequate markings can indicate whether markings are expected to change along the path, and how this may require the specification of several possibilities.

The system 100 can be configured to store test results and/or report test results (e.g., errors, successes, etc.) to a central server. In one embodiment, the system 100 uses SNMP traps sent to an SNMP monitoring server to automatically report issues with DSCP traces and/or lack of protection. In another embodiment, the system 100 is configured to report the inability to trace the DSCP, incorrect DSCP marking traces, out-of-contract packets in excess of a threshold, and protection measures below a configured threshold. The system can report these results to a central server or can store the information in a local log file or database, for example. In another embodiment, the system can store certain results in a local storage and report to a server or other entity results matching specific criteria or exceeding a reporting threshold.

Further, the system 100 can be configured to periodically test the network for the IP addresses in the cache. The system 100 can also be configured to remove stored test results and/or destination network addresses and start over. For example, the system 100 can delete cached test results that are older than a specified age limit. As another example, the system 100 can delete cached test results after reaching a threshold, such as a number of test results, a number of errors, a number of successes, a cache size, a configuration, a modification, a time period, and so forth.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to test any network, device, and service requirements. Those skilled in the art will readily recognize various modifications and changes that may be made to the principles described herein without following the example embodiments and applications illustrated and described herein, and without departing from the spirit and scope of the disclosure.

We claim:

1. A method comprising:
maintaining, at an agent device, a cache of destination network addresses based on prior network communications, the agent device being configured to determine whether a differentiated services code point trace is adequate;
identifying a destination network address to test; and
automatically sending to the destination network address, via the agent device, a network test configured to determine a differentiated services code point trace.

2. The method of claim 1, wherein the agent device comprises one of a phone, a conferencing system, a computer, a media player, a smart television, a video game console, and a streaming device.

3. The method of claim 1, further comprising reporting a result of the network test to a server.

4. The method of claim 3, wherein the agent device is configured to report at least one of an inability to trace the differentiated services code point, an incorrect differentiated services code point marking trace, and out-of-contract packets in excess of a threshold.

5. The method of claim 1, wherein the network test is further configured to report an out-of-contract packet in excess of a threshold.

6. The method of claim 1, wherein the agent device is configured to use simple network management protocol traps sent to a simple network management protocol monitoring system to report network problems.

7. The method of claim 1, wherein the agent device is configured to store and detect network information.

8. The method of claim 1, wherein at least one of the cache of destination network addresses, a destination network address in the cache of destination network addresses, and a network test result is configured to expire after a specified amount of time.

9. The method of claim 1, wherein a redundant network test is performed periodically.

10. The method of claim 1, wherein identifying a destination network address to test comprises determining whether the destination network address is in the cache of destination network addresses.

11. The method of claim 1, wherein the agent device is configured to identify a service provider associated with each network segment in a path to the destination network address based on at least one of a list of network subnet addresses associated with each service provider and a list of internet protocol addresses of multiprotocol label switching routers connected to a customer edge router at each site.

12. The method of claim 1, wherein the agent device uses marking templates to analyze traffic as it moves from a network segment to another network segment.

13. The method of claim 1, further comprising:
receiving a new destination network address; and
automatically sending the network test to the new destination network address via the agent device.

14. A system comprising:
a processor; and
a computer-readable medium having stored therein instructions which, when executed by the processor, cause the processor to perform a method comprising:
maintaining, at an agent device, a cache of destination network addresses based on prior network communications, the agent device being configured to determine whether a differentiated services code point trace is adequate;

identifying a destination network address to test; and automatically sending to the destination network address, via the agent device, a network test configured to determine a differentiated services code point trace.

15. The system of claim 14, wherein the agent device comprises one of a phone, a conferencing system, a computer, a media player, a smart television, a video game console, and a streaming device.

16. The system of claim 14, wherein the network test is further configured to report an out-of-contract packet in excess of a threshold.

17. A non-transitory computer-readable storage medium having stored therein instructions which, when executed by a computing device, cause the computing device to perform a method comprising:

maintaining, at an agent device, a cache of destination network addresses based on prior network communications, the agent device being configured to determine whether a differentiated services code point trace is adequate;

identifying a destination network address to test; and automatically sending to the destination network address, via the agent device, a network test configured to determine a differentiated services code point trace.

18. The non-transitory computer-readable storage medium of claim 17, wherein the network test is further configured to report an out-of-contract packet in excess of a threshold.

19. The non-transitory computer-readable storage medium of claim 17, wherein the agent device comprises one of a phone, a conferencing system, a computer, a media player, a smart television, a video game console, and a streaming device.

20. The non-transitory computer-readable storage medium of claim 17, wherein identifying a destination network address to test comprises determining whether the destination network address is in the cache of destination network addresses.

* * * * *